(12) United States Patent
Chu

(10) Patent No.: US 11,581,767 B2
(45) Date of Patent: Feb. 14, 2023

(54) PERMANENT MAGNET MOTOR

(71) Applicant: ADLEE POWERTRONIC CO., LTD., Taichung (TW)

(72) Inventor: Shou-Yu Chu, Taichung (TW)

(73) Assignee: ADLEE POWERTRONIC CO., LTD., Taichung (TW)

( * ) Notice: Subject to any disclaimer, the term of this patent is extended or adjusted under 35 U.S.C. 154(b) by 88 days.

(21) Appl. No.: 17/124,844

(22) Filed: Dec. 17, 2020

(65) Prior Publication Data

US 2021/0104927 A1 Apr. 8, 2021

Related U.S. Application Data

(63) Continuation-in-part of application No. 16/123,533, filed on Sep. 6, 2018, now abandoned.

(51) Int. Cl.
*H02K 1/27* (2022.01)
*H02K 1/276* (2022.01)

(52) U.S. Cl.
CPC ................... *H02K 1/2766* (2013.01)

(58) Field of Classification Search
CPC .. H02K 1/2766; H02K 1/2773; H02K 1/2753; H02K 1/165
USPC ............. 310/156.01, 156.53, 156.56, 156.57
See application file for complete search history.

(56) References Cited

U.S. PATENT DOCUMENTS

| | | | |
|---|---|---|---|
| 5,731,647 A * | 3/1998 | Schuller | H02K 21/046 310/156.53 |
| 8,044,548 B2 | 10/2011 | Sakai et al. | |
| 2008/0224558 A1* | 9/2008 | Ionel | H02K 1/2766 310/156.57 |
| 2009/0236923 A1* | 9/2009 | Sakai | H02K 21/16 310/156.43 |
| 2014/0246938 A1 | 9/2014 | Lillington | |
| 2015/0108865 A1* | 4/2015 | Fujisawa | H02K 1/2773 310/156.07 |
| 2015/0171682 A1* | 6/2015 | Fujisawa | H02K 1/272 310/156.53 |
| 2017/0063187 A1* | 3/2017 | Hao | H02K 21/14 |

* cited by examiner

*Primary Examiner* — Michael Andrews
(74) *Attorney, Agent, or Firm* — Muncy, Geissler, Olds & Lowe, P.C.

(57) ABSTRACT

A permanent magnet motor is provided, including: a stator and a rotor. The stator has a plurality of windings. The rotor has a plurality of magnet placement slots and a plurality of air gaps. The plurality of magnet placement slots include a plurality of circumferential magnet placement slots circumferentially arranged and a plurality of radial magnet placement slots radially extending. The circumferential magnet placement slots and the radial magnet placement slots are circumferentially alternately arranged. The plurality of air gaps are adjacent to part of the plurality of magnet placement slots and distributed to be on a d-axis flux path of the rotor.

14 Claims, 4 Drawing Sheets

PERMANENT MAGNET MOTOR

The present invention is a CIP of application Ser. No. 16/123,533, filed Sep. 6, 2018, the entire contents of which are hereby incorporated by reference.

BACKGROUND OF THE INVENTION

Field of the Invention

Description of the Prior Art

Generally, a number, positions or arrangement angles of magnets in a rotor are adjusted to reach desired characteristics, such as different speeds, loads or performances. Taiwan patent number 129116 discloses that a configuration of the magnets is changeable. However, a radial magnet only provides a magnetic field for single magnetic pole, which results in requirement of two of radial magnets disposed between two adjacent magnetic poles. Therefore, more magnets are needed and the cost is increased, and a magnetic pole included angle is decreased due to an interval between the two radial magnets, which results in low output.

U.S. Pat. No. 8,044,548 discloses that a rotor includes a plurality of circumferential and radial magnet placement slots, and each of the plurality of circumferential and radial magnet placement slots receives a magnet. Magnetic flux density and magnetizing direction on the d-axis and q-axis may be defined by placing the magnets with different materials in the circumferential and radial magnet placement slots. In addition, the rotor described in the patent may have air gaps. However, the air gaps described in the patent cannot cooperate well with both the d-axis and the q-axis flux path, and the q-axis flux path is blocked, which is unable to obtain preferable speed and torque at the same time.

The present invention is, therefore, arisen to obviate or at least mitigate the above-mentioned disadvantages.

SUMMARY OF THE INVENTION

The main object of the present invention is to provide a permanent magnet motor whose flux path is plannable to obtain expected performance.

To achieve the above and other objects, the present invention provides a permanent magnet motor, including: a stator and a rotor. The stator has a plurality of windings. The rotor has a plurality of magnet placement slots and a plurality of air gaps. The plurality of magnet placement slots include a plurality of circumferential magnet placement slots circumferentially arranged and a plurality of radial magnet placement slots radially extending. The circumferential magnet placement slots and the radial magnet placement slots are circumferentially alternately arranged. The plurality of air gaps are adjacent to a part of the plurality of magnet placement slots and distributed to be on a d-axis flux path of the rotor. Each of the plurality of air gaps includes a distal end which is directed toward and adjacent to one of the plurality of circumferential magnet placement slots and the plurality of radial magnet placement slots, and the distal ends of the plurality of air gaps are distributed in fashions in compliance with sides, facing the plurality of air gaps, of the plurality of circumferential magnet placement slots and the plurality of radial magnet placement slots.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
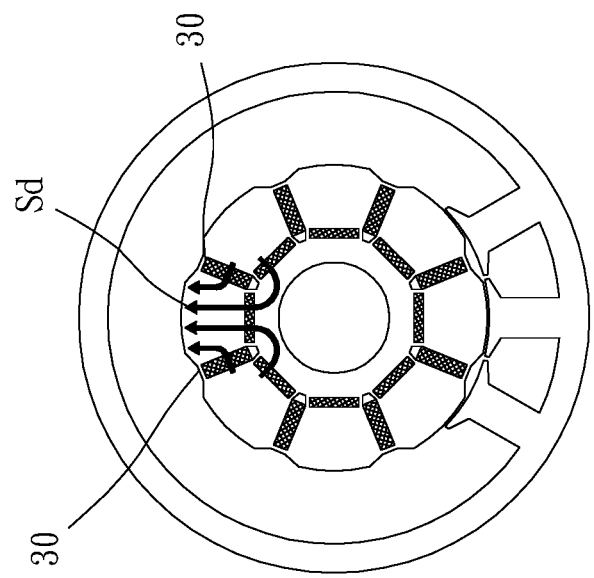
FIG. 1 is a schematic diagram of positions of a d-axis and a q-axis.
Figure 2:
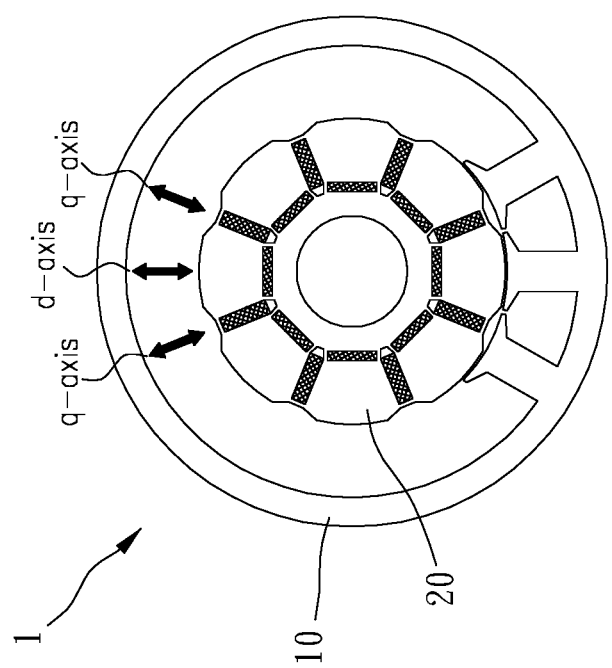
FIG. 2 is a schematic diagram of a d-axis flux path.
Figure 3:
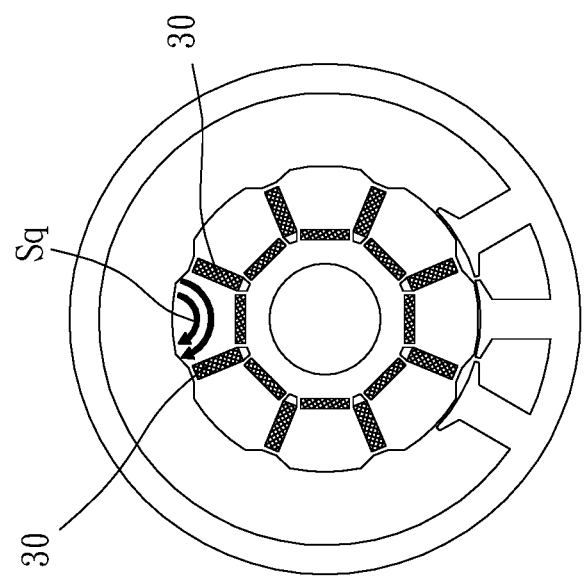
FIG. 3 is a schematic diagram of a q-axis flux path.

Please refer to FIGS. 1 to 7 for a preferable embodiment of the present invention. A permanent magnet motor 1 of the present invention includes a stator 10 and a rotor 20.

The stator 10 has a plurality of windings 11. The rotor 20 has a plurality of magnet placement slots 21 and a plurality of air gaps 22. The plurality of magnet placement slots 21 include a plurality of circumferential magnet placement slots 211 circumferentially arranged and a plurality of radial magnet placement slots 212 radially extending. The circumferential magnet placement slots 211 and the radial magnet placement slots 212 are circumferentially alternately arranged. The plurality of air gaps 22 are adjacent to part of the magnet placement slots and distributed to be on a d-axis flux path Sd of the rotor 20. Therefore, the flux path is plannable to obtain expected performance.

The plurality of magnet placement slots 21 receive a plurality of magnets 30. At least a part of the circumferential magnet placement slots 211 receive a part of the plurality of magnets 30, and at least a part of the plurality of radial magnet placement slots 212 receive a part of the plurality of magnets 30 so as to minimize armature reaction of an unidirectionally-rotary motor. In this embodiment, each of the magnet placement slots 21 receives one of the magnets 30, which has high efficiency and high output and is smooth and stable in operation. However, the arrangement of the magnets may be optionally changed according to various requirements. For example, a part or all of the plurality circumferential magnet placement slots receive magnets, and the plurality of radial magnet placement slots are empty so as to obtain a higher rotating speed; a part or all of the plurality of radial magnet placement slots receive a plurality of magnets, and the plurality of circumferential magnet placement slots are empty so as to obtain a higher rotating speed; or, all of the magnet placement slots may be empty, to form a reluctance motor.

The plurality of magnets may be plannably arranged to have different pole number in the manufacturing process. For example, when the plurality of radial magnet placement slots are empty, the magnets 30 received in the plurality of circumferential magnet placement slots 211 may be configured in a N-S-N-S . . . manner to form eight poles or be configured in a N-N-S-S manner to form four poles. A number of the poles of the magnets can be plannably changed as a number of the plurality of circumferential magnet placement slots 211 is a multiple of four. Preferably, the radial magnet placement slots which are empty may further receive permeability materials under a four-pole condition for flux continuity and preferable output performance.

The plurality of magnets 30 preferably are identical in physical characteristic. The physical characteristic includes at least one of material, shape and size. However, the plurality of magnets 30 may be different in the physical characteristic according to various requirements. For example, materials of the plurality of magnets 30 may be the same or different, or shapes of the plurality of magnets 30 may be the same or different. At least one of the plurality of magnets 30 may have a shape different from or the same as a shape of at least one of the plurality of magnet placement slots 21. In this embodiment, at least one of the plurality of radial magnet placement slots 212 extends and terminates between two end surfaces, facing each other, of adjacent two of the circumferential magnet placement slots 211, and the magnets 30 are cuboids and there are intervals 60 at respective ends of the magnet placement slots 21 after the magnets 30 are placed in the magnet placement slots 21. Preferably, along a circumferential direction of the rotor 20, the two end surfaces entirely correspond to one of the plurality of radial magnet placement slots 212 located between the two end surfaces, and the intervals 60 can reduce magnetic flux leakage.

Figure 4:
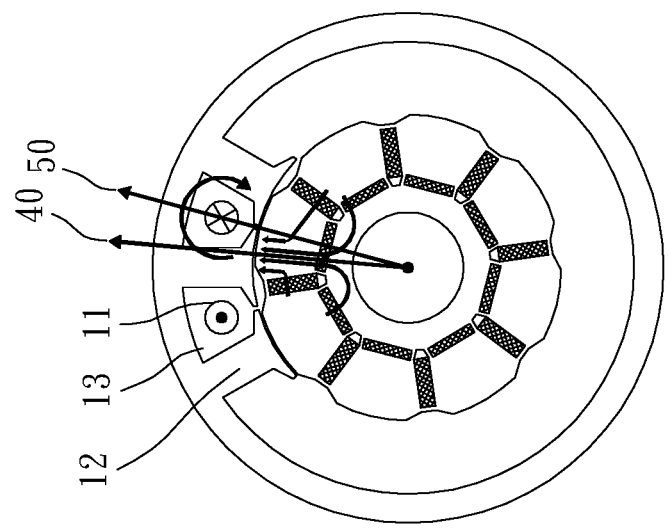
FIG. 4 is a schematic diagram when a magnetic axis deviates due to armature reaction.

A magnetic flux central axis 40 of the permanent magnet motor is located on a magnetic pole central axis 50 as there is no armature reaction. After the windings 11 of the stator 10 are electrified, a magnetic field is generated to interact with a magnetic field of the plurality of magnets 30, and a new magnetic flux central axis 40 which deviates from the magnetic pole central axis 50 is produced due to the armature reaction, as shown in FIG. 4. A deviation of the magnetic flux central axis 40 may result in low effective magnetic flux and low output performance. The plurality of air gaps 22 can provide reluctance so as to reduce the deviation of the magnetic flux central axis 40 relative to the magnetic pole central axis 50 caused by the armature reaction. The armature reaction can be effectively reduced.

The plurality of air gaps 22 includes at least one first air gap 22a and a plurality of second air gaps 22b, a distal end 225a of each of the at least one first air gap 22a is directed toward and adjacent to one of the plurality of circumferential magnet placement slots 211, and a distal end 225b of each of the plurality of second air gaps 22b is directed toward and adjacent to one of the plurality of radial magnet placement slots 212. Said distal end 225a of the at least one first air gap 22a and said distal ends 225b of the plurality of second air gaps 22b are distributed in fashions in compliance with sides, facing the plurality of air gaps 22, of the plurality of circumferential magnet placement slots 211 and the plurality of radial magnet placement slots 212. Therefore, the permanent magnet motor 1 can define preferable magnetic isolation path and magnetic flux path, which improves output performance.

Specifically, distances between one of the plurality of air gaps 22 and its adjacent two of the plurality of air gaps 22 are preferably different; relative to an outer periphery of the rotor 20, the plurality of air gaps 22 are arcuately distributed in conformity with a q-axis flux path Sq of the rotor 20 and radially inwardly concave; and the plurality of air gaps 22 are distributed arcuately toward the circumferential magnet placement slots 211 so as to retain a part of the q-axis flux path Sq and decrease the armature reaction. In other embodiments, the plurality of air gaps may be distributed adjacent to the outer periphery of the rotor toward which the d-axis flux path Sd directs. For example, a part of ends of the plurality of air gaps may be arcuately distributed adjacent to the outer periphery of the rotor, which can minimize the armature reaction.

The outer periphery of the rotor 20 includes a plurality of concave portions 23 which are contracted inwardly relative to outer ends of the plurality of magnets 30 so as to decrease the influence of the armature reaction on magnet degaussing. The deviation of the magnetic flux central axis 40 relative to the magnetic pole central axis 50 caused by the armature reaction may enhance a magnetic field of an end of the magnets 30 radially close to the outer periphery of the rotor 20. If a direction of the enhanced magnetic field is opposite to that of the magnetic poles of the magnets 30 radially arranged, there may be degauss caused to the magnets 30; if the direction of the enhanced magnetic field is the same as that of the magnetic poles of the magnets 30 radially arranged, it may cause magnetic saturation. Both configurations described above can affect distribution of the magnetic flux.

The plurality of windings 11 of the stator 10 are capable of being adjustable for current distribution so as to adjust a ratio of a d-axis flux and a q-axis flux entering the rotor 20. By means of adjustment of the ratio of the d-axis flux and the q-axis flux entering the rotor 20, the deviation of the magnetic flux central axis 40 relative to the magnetic pole central axis 50 caused by the armature reaction can be adjusted, which means that the effective magnetic flux and the output performance of the permanent magnet motor can be adjusted. For example, the deviation of the magnetic flux central axis may be pre-compensated by adjusting current applied to the windings so that the magnetic flux central axis 40 overlaps the magnetic pole central axis 50, which improves effective magnetic flux and output performance.

The plurality of radial magnet placement slots may be directly open at the outer periphery of the rotor so that it is easy to manufacture and place the magnets. The magnets 30 radially arranged may also be flush with or retracted inwardly within the radial magnet placement slots 212. The rotor 20 may further include a plurality of rib portions 213 and each of the rib portions 213 is disposed radially next to an outer end of one of the radial magnet placement slots 212, and the plurality of radial magnet placement slots 212 are non-penetrated through the outer periphery of the rotor 20 so as to increase structural strength of the rotor 20 and prevent the magnets 30 from departing due to centrifugal force. The rib portions 213 may be flush with or retracted inwardly relative to the outer periphery of the rotor 20. An outer end of one of the plurality of magnets 30 is abutted against one of the plurality of rib portions 213 so that the plurality of magnets 30 are stably restricted within the radial magnet placement slots 212.

The stator 10 further includes a plurality of teeth portions 12 extending radially, and the plurality of windings 11 are disposed around the plurality of teeth portion 12 respectively. The stator 10 further includes a plurality of stator slots 13 which are configured to receive the plurality of windings 11. Openings of the stator slots 13 may be necked, and a width of each of the openings of the stator slots 13 is in negative proportion to the magnetic flux leakage. Please refer to FIG. 7, a magnetic pole included angle A defined by the plurality of magnets 30 between adjacent two of the plurality of radial magnet placement slots 212 is smaller than a magnetic pole angle B defined by two central axes, extending radially, of adjacent two of the plurality of radial magnet placement slots 212. A magnetic flux of each of the magnetic poles may be short-circuited to the adjacent magnetic poles through the teeth portion 12 of the stator 10 and result in magnetic flux leakage. A short-circuit magnetic flux cannot interact with the magnetic flux created by the windings 11 of the stator 10, which results in low effective magnetic flux and low output performance. Therefore, the smaller the magnetic pole included angle A is, the smaller the magnetic flux leakage is.

The outer periphery of the rotor 20 may include one or a plurality of eccentric arc segments or straight segments 24 so that air gaps between the rotor 20 and the stator 10 are gradually increased or decreased and flux linkage are gradually increased or decreased, to decrease the cogging torque. In this embodiment, the outer periphery of the rotor 20 includes a plurality of straight segments 24. However, the outer periphery of the rotor may include a plurality of arc segments, and at least one of the plurality of arc segments (preferably all) and the rotor are eccentric; the outer periphery of the rotor may include one or a plurality of the arc segments which are concentric with the rotor.

Figure 8:
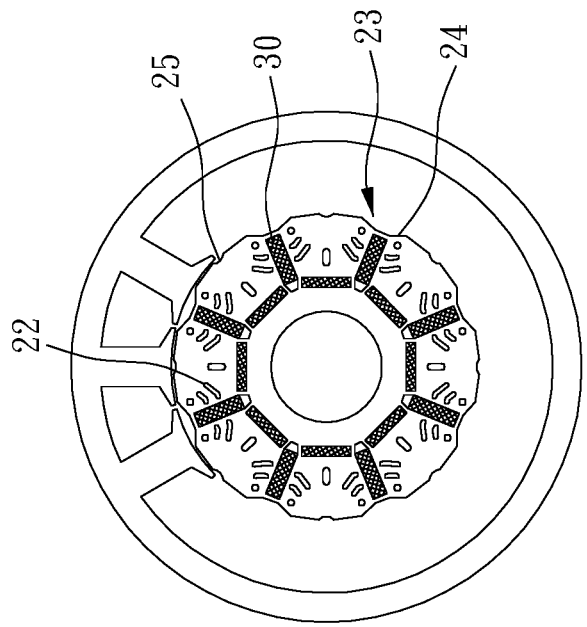
FIG. 8 is a schematic diagram of another preferable embodiment of the present invention.
Figure 7:
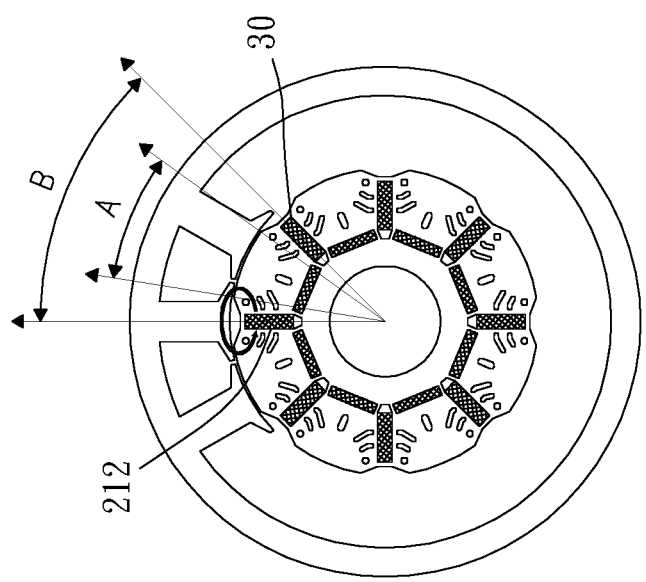
FIG. 7 is a schematic diagram of a preferable embodiment of the present invention.

In another embodiment, the outer periphery of the rotor 20 has a retracted surface 25 on a d-axis of the rotor 20, as shown in FIG. 8. The magnetic flux is strongest near the d-axis or the magnetic pole central axis 50 on the outer periphery of the rotor 20 where produces lager cogging torque. The retracted surface 25 properly disposed can increase the air gaps to increase the reluctance so as to reduce the cogging torque.

In other embodiments, the rotor may further include a plurality of second magnet placement slots which are disposed between some of adjacent two of the plurality of radial magnet placement slots, and at least one of the plurality of second magnet placement slots receives at least one of the magnets, which can increase flux of the magnetic pole and torque.

Figure 6:
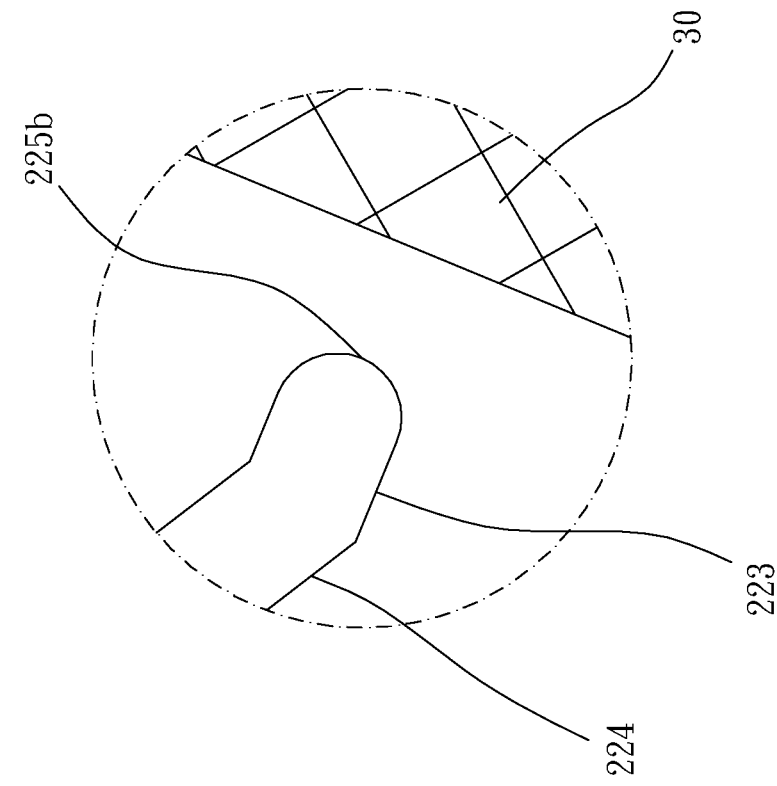
FIG. 6 is a partial enlargement of FIG. 5.
Figure 5:
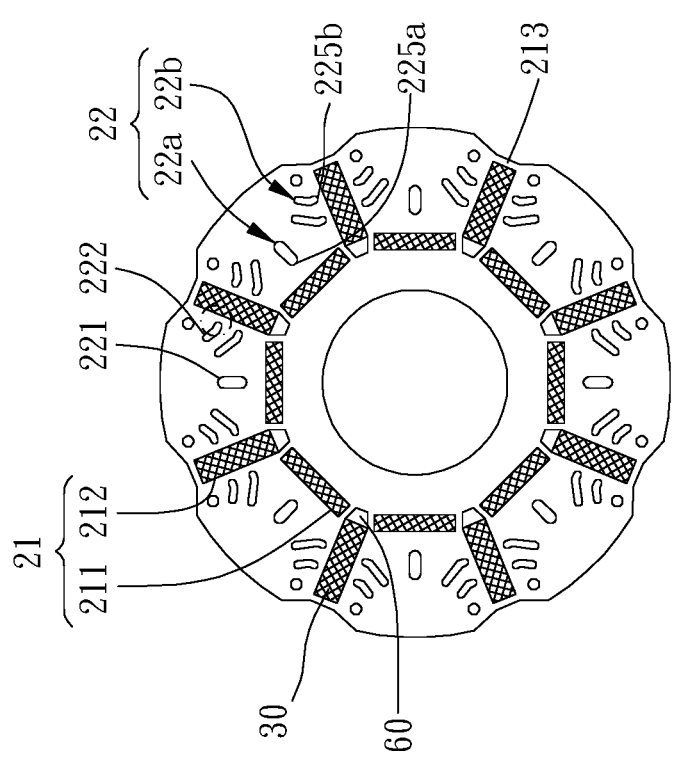
FIG. 5 is a schematic diagram of a rotor of a preferable embodiment of the present invention.

Please refer FIGS. 5 and 6, in all embodiments described above, the at least one first air gap 22a includes at least one of straight groove 221 extending lateral to one of the plurality of circumferential magnet placement slots 211, and the plurality of second air gaps 22b includes a plurality of non-straight grooves 222 which are located at two sides of the at least one straight groove 221. At least one of the plurality of non-straight grooves 222 includes an end segment 223 which is perpendicular to one of the plurality of radial magnet placement slots 212 and a straight segment 224 extending from the end segment 223 toward the radial direction of the rotor 20 so as to define preferable magnetic isolation path and magnetic flux path, which improves output performance. In other embodiments, the air gaps may include straight grooves or oblique straight grooves which are located at two sides of the at least one straight groove; the plurality of non-straight grooves may include arc grooves or any other types. Preferably, at least one of the plurality of non-straight grooves 222 extends in a direction directed to the d-axis flux path Sd for preferable magnetic isolation path and magnetic flux path.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A permanent magnet motor, including:
    a stator, having a plurality of windings;
    a rotor, having a plurality of magnet placement slots and a plurality of air gaps, the plurality of magnet placement slots including a plurality of circumferential magnet placement slots circumferentially arranged and a plurality of radial magnet placement slots radially extending, the circumferential magnet placement slots and the radial magnet placement slots being circumferentially alternately arranged, the plurality of air gaps being adjacent to a part of the plurality of magnet placement slots and distributed to be on a d-axis flux path of the rotor;
    wherein the plurality of air gaps includes at least one first air gap and a plurality of second air gaps, a distal end of each of the at least one first air gap is directed toward and adjacent to one of the plurality of circumferential magnet placement slots, a distal end of each of the plurality of second air gaps is directed toward and adjacent to one of the plurality of radial magnet placement slots, said distal end of the at least one first air gap and said distal ends of the plurality of second air gaps are distributed in fashions in compliance with sides of the plurality of circumferential magnet placement slots and the plurality of radial magnet placement slots, and the sides face the plurality of air gaps;
    wherein the at least one first air gap includes at least one straight groove extending lateral to one of the plurality of circumferential magnet placement slots, and the plurality of second air gaps include a plurality of non-straight grooves which are located at two sides of the at least one straight groove.

2. The permanent magnet motor of claim 1, wherein the plurality of magnet placement slots receive a plurality of magnets, at least a part of the plurality of circumferential magnet placement slots receive a part of the plurality of magnets, and at least a part of the plurality of radial magnet placement slots receive a part of the plurality of magnets.

3. The permanent magnet motor of claim 2, wherein the plurality of magnets are different in physical characteristic, and the physical characteristic includes at least one of material, shape and size.

4. The permanent magnet motor of claim 1, wherein the plurality of magnet placement slots receive a plurality of magnets, and at least one of the plurality of magnets has a shape different from a shape of at least one of the plurality of magnet placement slots which receives the at least one of the plurality of magnets.

5. The permanent magnet motor of claim 1, wherein the plurality of magnet placement slots receive a plurality of magnets, and the plurality of air gaps are distributed adjacent to an outer periphery of the rotor toward which the d-axis flux path directs.

6. The permanent magnet motor of claim 1, wherein the plurality of magnet placement slots receive a plurality of magnets, and relative to an outer periphery of the rotor, the plurality of air gaps are arcuately distributed in conformity with a q-axis flux path of the rotor and radially inwardly concave.

7. The permanent magnet motor of claim 6, wherein the plurality of windings of the stator are capable of being adjustable for current distribution so as to adjust a ratio of a d-axis flux and a q-axis flux entering the rotor.

8. The permanent magnet motor of claim 1, wherein the plurality of radial magnet placement slots receive a plurality of magnets, and an outer periphery of the rotor includes a plurality of concave portions which are contracted inwardly relative to outer ends of the plurality of magnets.

9. The permanent magnet motor of claim 1, wherein the rotor further includes a plurality of rib portions, and each of the rib portions is disposed radially next to an outer end of one of the plurality of radial magnet placement slots.

10. The permanent magnet motor of claim 9, wherein the plurality of radial magnet placement slots receive a plurality of magnets, and an outer end of one of the plurality of magnets is abutted against one of the plurality of rib portions.

11. The permanent magnet motor of claim 1, wherein the plurality of magnet placement slots receive a plurality of magnets, and an outer periphery of the rotor has a retracted surface on a d-axis of the rotor.

12. The permanent magnet motor of claim 1, wherein at least one of the plurality of non-straight grooves includes an end segment which is perpendicular to one of the plurality of radial magnet placement slots and a straight segment extending from the end segment toward the radial direction of the rotor.

13. The permanent magnet motor of claim 1, wherein distances between one of the plurality of air gaps and its adjacent two of the plurality of air gaps are different.

14. The permanent magnet motor of claim 1, wherein at least one of the plurality of radial magnet placement slots extends and terminates between two end surfaces, facing each other, of adjacent two of the plurality of circumferential magnet placement slots, and along a circumferential direction of the rotor, the two end surfaces entirely correspond to one of the plurality of radial magnet placement slots located between the two end surfaces.

\* \* \* \* \*